March 15, 1966
P. CHERRIN
3,239,993
APPARATUS FOR FORMING PLASTIC BAGS
Filed Nov. 15, 1961
4 Sheets-Sheet 1
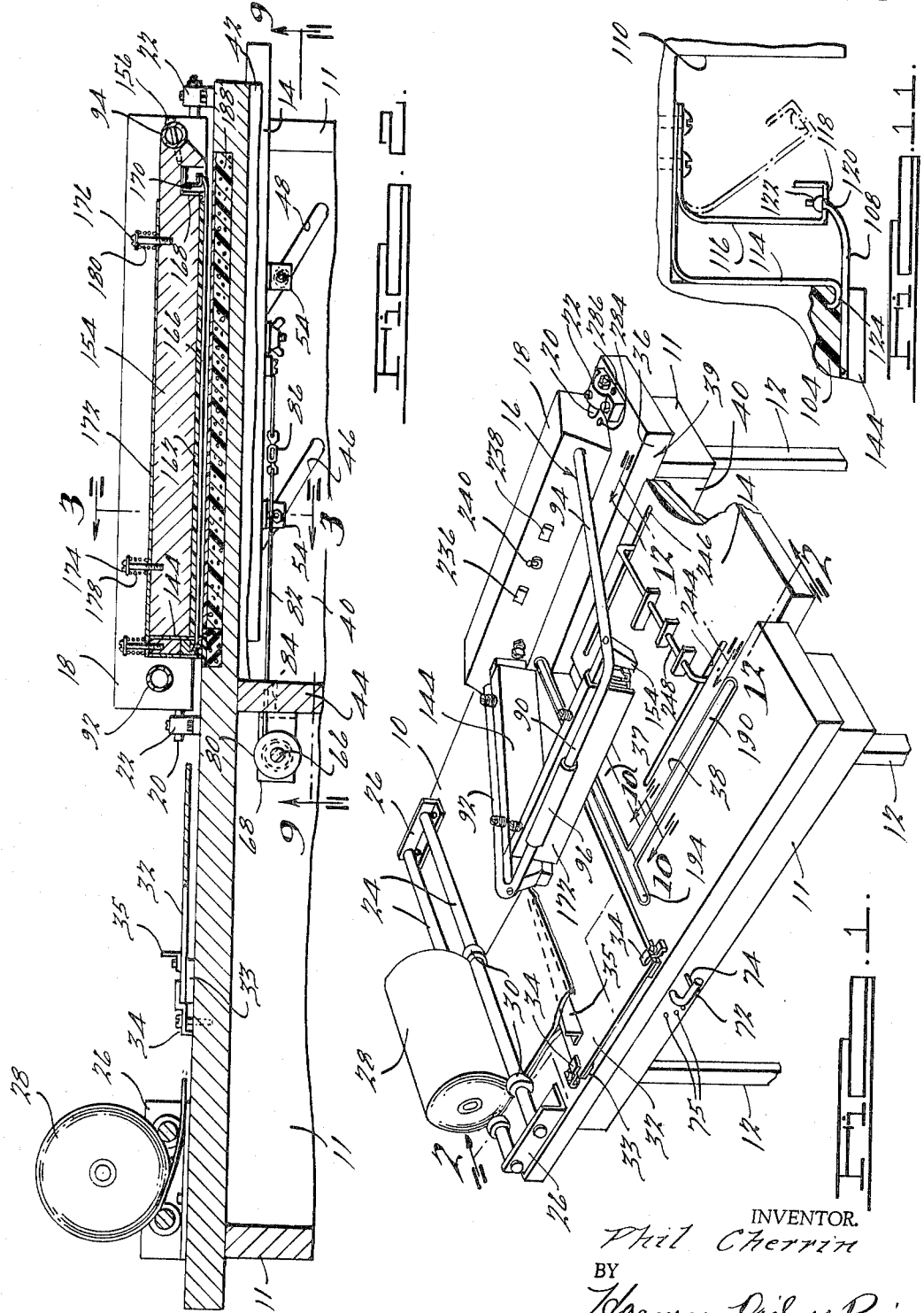
INVENTOR.
Phil Cherrin
BY
Harness, Dickey & Pierce
ATTORNEYS

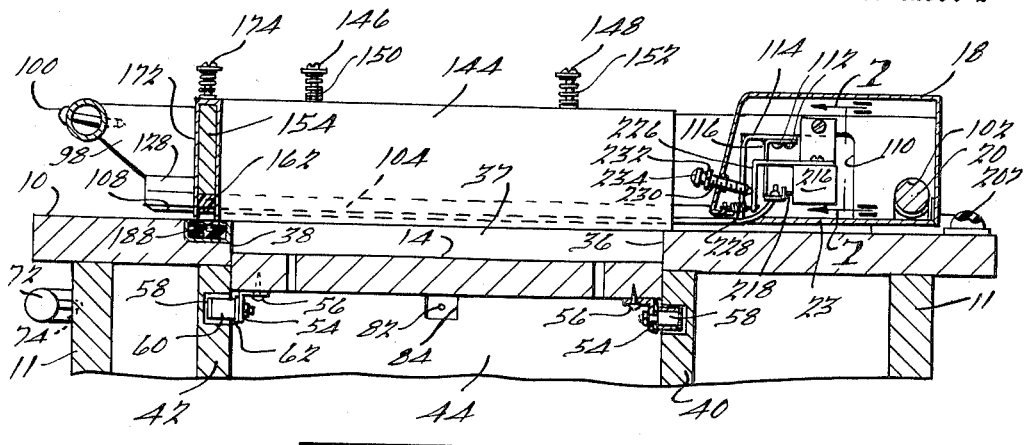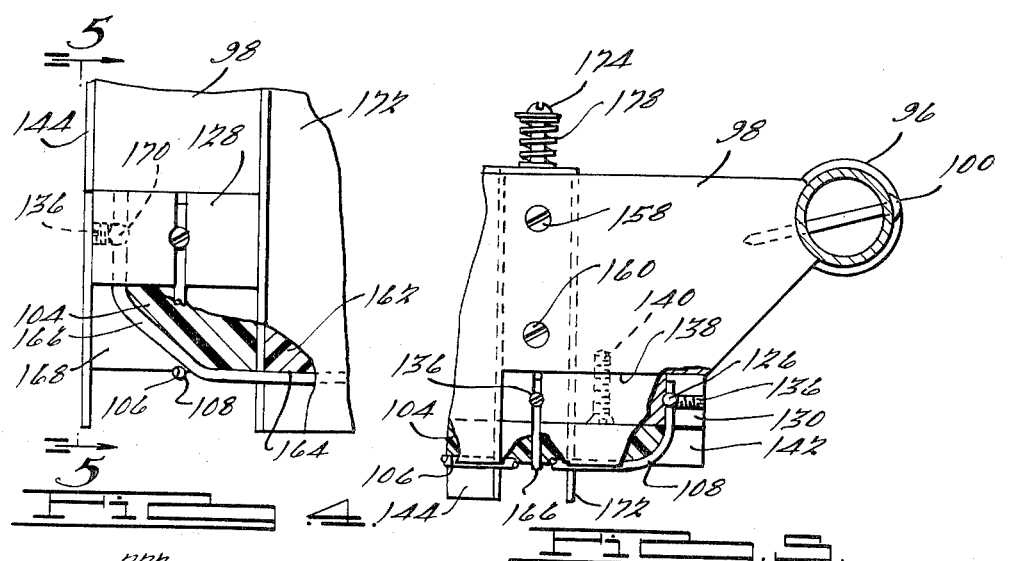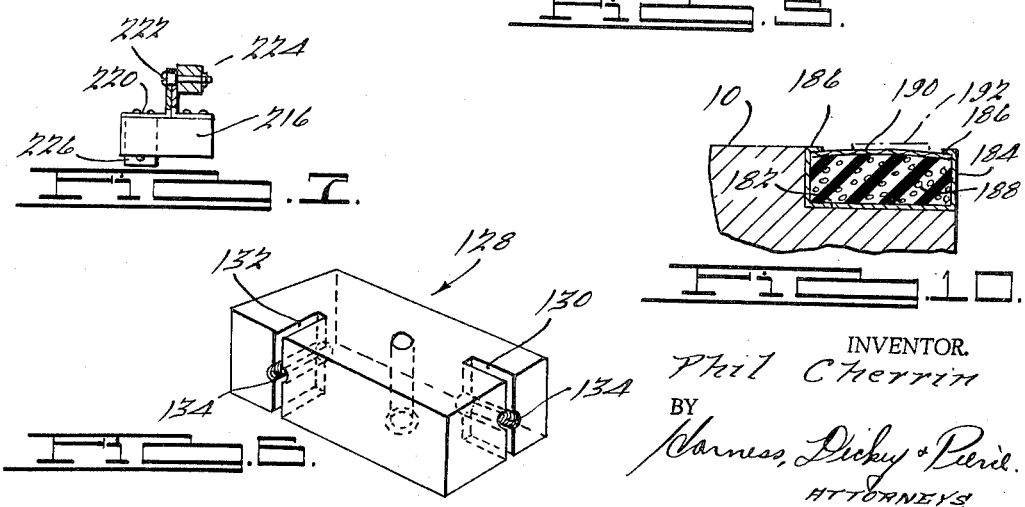

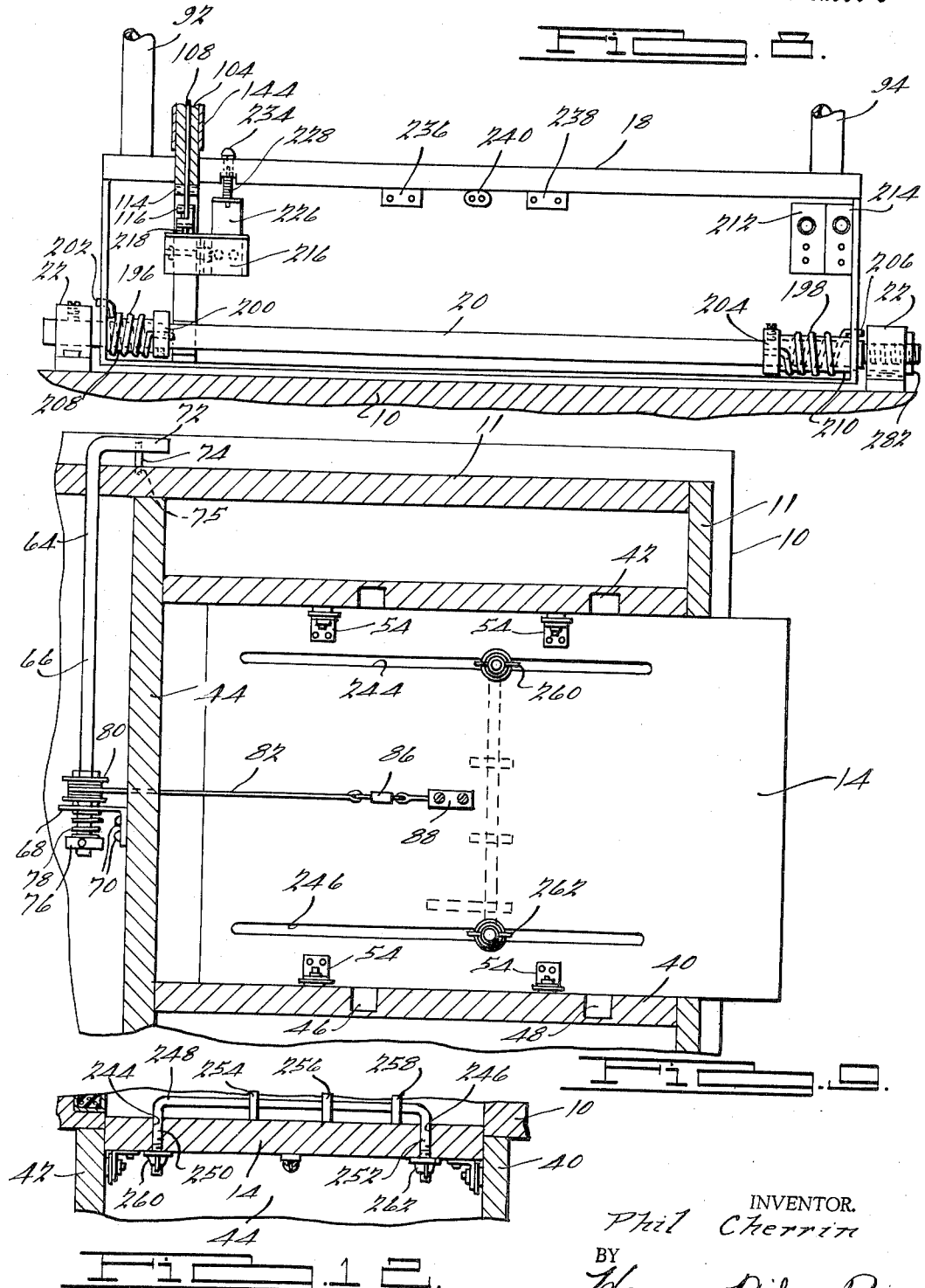

March 15, 1966  P. CHERRIN  3,239,993
APPARATUS FOR FORMING PLASTIC BAGS
Filed Nov. 15, 1961  4 Sheets-Sheet 4
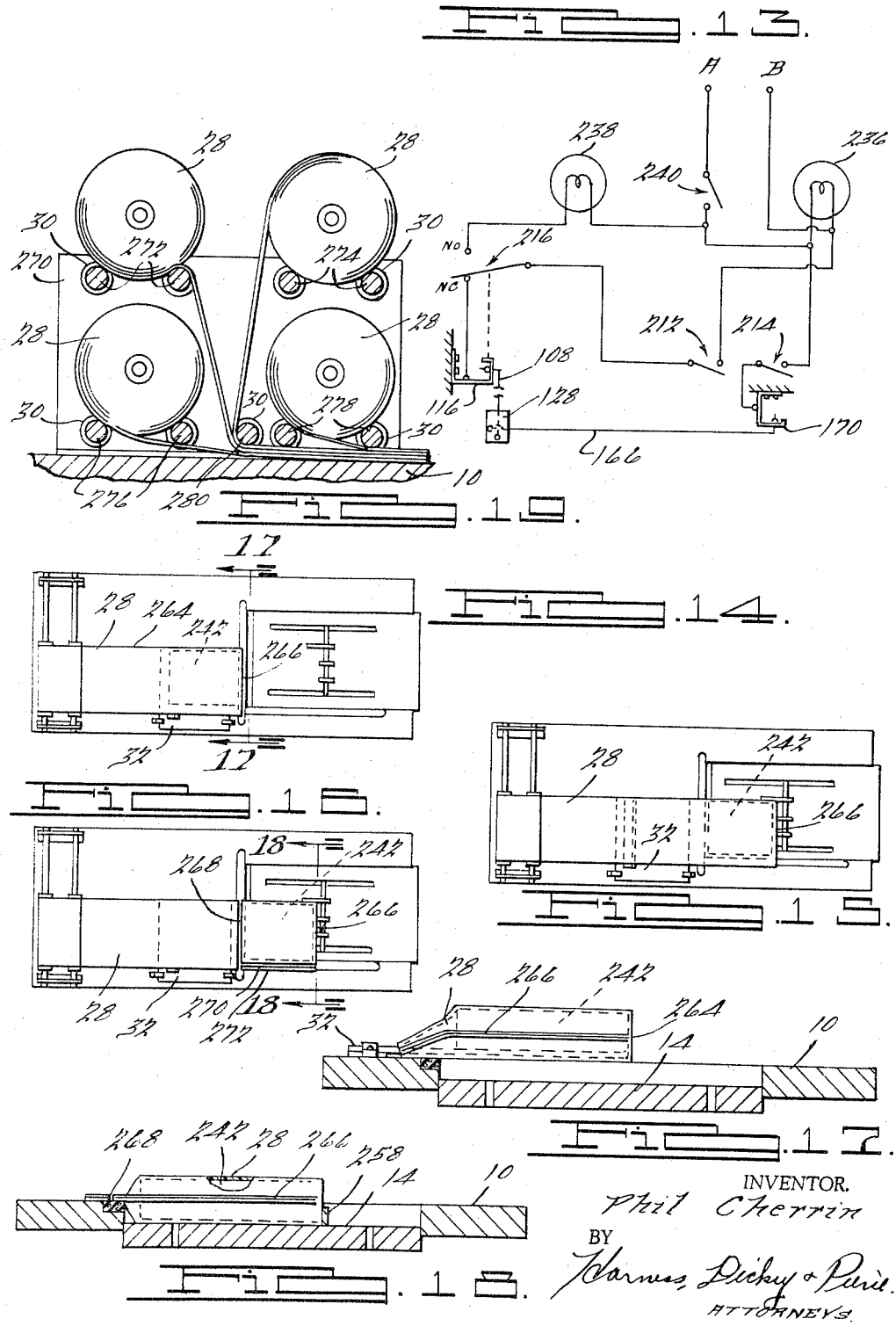
INVENTOR.
Phil Cherrin
BY
Harness, Dickey & Pierce
ATTORNEYS

United States Patent Office 3,239,993
Patented Mar. 15, 1966

3,239,993
APPARATUS FOR FORMING PLASTIC BAGS
Phil Cherrin, Huntington Woods, Mich., assignor of one-fifth each to Sam Cherrin, Abe Cherrin, Lem Cherrin, and Archie Cherrin
Filed Nov. 15, 1961, Ser. No. 152,476
11 Claims. (Cl. 53—182)

The present application is a continuation-in-part of my prior application, Serial No. 131,923, filed August 16, 1961, and now abandoned.

The present invention relates generally to packaging, and more particularly to an improved packaging apparatus for forming plastic film bags from a continuous length of center-fold plastic film and for sealing articles therein.

It is a primary object of the present invention to provide a novel packaging apparatus of extremely simple and inexpensive construction which may be operated by an unskilled operator to quickly, economically and effectively form and seal articles within plastic film bags, whereby packaging may be performed without the use of relatively expensive and costly to handle preformed bags, tapes, closures, fasteners and so on.

Another object of the present invention resides in the provision of a unique apparatus of the above type which is extremely flexible in its capabilities, being readily adapted to form plastic film bags of varying sizes from sheet film material and to fully seal articles of almost any size and shape within the bags formed, only very simple adjustments of the apparatus being required to adapt it for the packaging of different size and shape articles.

A further object of the present invention concerns the provision of a novel packaging apparatus of the type described utilizing heating resistance wires to cut and seal a plurality of layers of plastic film to form and seal a bag about any desired article, which apparatus is so arranged that power is required only when cutting and sealing is taking place, whereby the safety and comfort of the operator is enhanced and power costs reduced, yet which is so arranged that instant heating is achieved when desired. A related object resides in the provision of unique means which provide for the substantially instantaneous heating of the resistance wires without any pre-heating while insuring that the wires cannot be overheated to the breaking point, and novel adjusting means for conveniently adjusting the temperature attained by the resistance wires when energized, whereby they may be preset to either seal and cut the film layers or to just seal them.

Yet a further object of the present invention concerns the provision of a unique apparatus of the type described utilizing heated resistance wires which is so arranged that the resistance wires are completely electrically isolated from the power circuit of the apparatus at all times other than when actual cutting and sealing is taking place, and which is provided with unique hold-down means for insuring that a plurality of layers of plastic film will be cut and sealed together even though one or more of the layers may be extremely wrinkled and hence not in good contact with other of the layers and for shielding the resistance wires when cutting and sealing is not taking place.

These and other objects of the present invention will become apparent from consideration of the specification taken in conjunction with the accompanying drawings, in which there are shown a primary embodiment of the invention and a modification thereof by way of example, and wherein:

FIGURE 1 is a perspective view of a packaging apparatus embodying the principles of the present invention;

FIGURE 2 is a longitudinal sectional view taken substantially along line 2—2 in FIGURE 1, but with the presser assembly in a lowered position;

FIGURE 3 is a transverse sectional view taken along line 3—3 in FIGURE 2;

FIGURE 4 is an enlarged fragmentary front elevational view, partly in section, of the apparatus illustrated in the preceding figures;

FIGURE 5 is an enlarged fragmentary side elevational view, partly in section, looking along line 5—4 in FIGURE 4;

FIGURE 6 is an enlarged perspective view of a part thereof;

FIGURE 7 is a view looking along line 7—7 in FIGURE 3;

FIGURE 8 illustrates in bottom plan a portion of the present apparatus;

FIGURE 9 illustrates in bottom plan another portion of the present apparatus, looking along line 9—9 in FIGURE 2;

FIGURE 10 is an enlarged transverse sectional view taken along line 10—10 in FIGURE 1;

FIGURE 11 is an enlarged fragmentary view of a portion of the apparatus shown in FIGURE 3 with certain parts removed for clarity;

FIGURE 12 is a sectional view taken along line 12—12 in FIGURE 1;

FIGURE 13 is a schematic wiring diagram illustrating a specific circuit which may be used with the present embodiment;

FIGURES 14, 15 and 16 are top plan views illustrating diagrammatically how the present packaging apparatus is used;

FIGURE 17 is a transverse sectional view taken along line 17—17 in FIGURE 14;

FIGURE 18 is a transverse sectional view taken along line 18—18 in FIGURE 16; and FIGURE 19 is a longitudinal sectional view of a modification of the present invention.

Referring to the drawings, an exemplary embodiment of an apparatus incorporating the principles of the present invention is clearly illustrated in FIGURE 1, and as can be seen, comprises a table 10 supported by a conventional frame 11 and a plurality of legs 12, the table being provided at one end with a drop table portion including a vertically movable platform 14. Pivotally supported on table 10 is a presser assembly, generally indicated at 16, including a housing 18 which is pivotally secured to table 10 about a fixed shaft or axle 20 supported by a pair of brackets 22 secured to the table top. Housing 18 is provided with a removable bottom cover 23 (FIGURE 3) and is adapted to contain the necessary circuitry. At the opposite end of table 10 there is provided roll supporting means including a pair of parallel rollers 24 rotatably secured by suitable bearings to a pair of brackets 26 secured to the top of table 10. Rotatably supported by rollers 24 is a roll of center-fold plastic film 28 which is maintained in position on the rollers by means of a pair of collars 30 on each of the rollers. Film material 28 may be of any width within the capacity of the apparatus, depending on the size and shape of the article to be packaged. Between the roll supporting means and the drop table portion there is provided a loading tray 32 secured to the table top by means of a pair of adjustable brackets 34, the loading tray being positioned parallel to and spaced slightly above the surface of table 10 by spacers 33 in the manner illustrated. Brackets 34 are provided at the forward end of loading tray 32 so that the center-fold plastic film 28 may be drawn from the roll longitudinally across the working surface of the table with one layer thereof below loading tray 32 and the other layer thereof above the tray. Loading tray 32 serves both to separate the layers of center-fold film and to provide means whereby articles may be easily slid or otherwise positioned between these layers, as will be more apparent later. To stiffen the tray so that it will not touch the table at its remote end, and to further facilitate separation of the layers of plastic film, there is provided a tapered reinforcing member 35 on the upper surface of the tray parallel to and adjacent the edge thereof nearest the roll of film. Presser assembly 16 is so arranged that it overlies platform 14 and is movable relative to table 10 to and from a lowered position wherein the lower surfaces thereof engage plastic film disposed on the upper working surface of the table.

Adjustable platform 14 is mounted in a corespondingly shaped cut-out portion or opening 39 in the table. This shape may be of any configuration, and is defined herein by a transversely extending inside edge 37, a rearward edge 36 and a forward edge 38 generally perpendicular to and intersecting inside edge 37. In any given application the corner of opening 36 defined by edges 37 and 38 should lie within the path of the plastic film when it is pulled from the roll. As is best illustrated in FIGURES 2, 3 and 9, platform 14 is mounted for vertically adjustable movement relative to the remainder of table 10. This is achieved by providing rearward and forward edges 36 and 38 with downwardly extending flush partitions 40 and 42 respectively which join with the righthand end of framework 11 to define a channel or opening 39 in which platform 14 may be vertically displaced. The inner end of the opening is defined by another partition 44 extending transversely between the forward and rearward portions of framework 11, as best seen in FIGURE 9. Partition 40 is provided with a pair of downwardly and outwardly inclined slots 46 and 48, and partition 42 is provided with a similarly disposed pair of identically shaped and size inclined slots 50 and 52, slots 46 and 50 being parallel to and in horizontal alignment with each other, and slots 48 and 52 being parallel to and in horizontal alignment with each other, all of the slots being inclined at the same angle with respect to horizontal. On the lower surface of platform 14 are provided four L-shaped bracketsets 54, secured to platform 14 by means of suitable screws or the like 56, each provided with a shoulder bolt 58 on which is rotatably positioned a roller 60 and a washer 62, as best seen in FIGURES 3 and 9. The diameter of the head of shoulder bolt 58 and of roller 60 is just slightly less than the width of slots 46 through 52, and brackets 54 are so positioned that the rollers will be engaged in their respective slots, one roller per slot, as best seen in FIGURE 9. The resulting assembly is thus such that platform 14 may be raised and lowered and maintained in level position by the rolling action of rollers 60 in their respective inclined slots, the platform being illustrated in a slightly lowered position throughout the drawings.

In the present embodiment, adjusting is effected by means of an L-shaped adjusting arm 64 having a shank portion 66 extending through the forward portion of framework 11 and rotatably supported by means of an L-shaped bracket 68 secured to the inside face of transverse partition 44 by suitable screws or the like 70. At the forwardly projecting end of the shaft 66 there is provided a handle portion 72 on which is disposed a holding pin 74 extending towards the front portion of framework 11 and adapted to engage any one of a plurality of semi-circularly arranged apertures 75 therein, depending on the angular position in which it is desired to maintain the adjusting arm. At the inner end of shaft 66 there is tightly secured a collar 76 which reacts with a coiled compression spring 78 between it and bracket 68 to urge pin 74 into one of the apertures 75 and maintain it there. On the other side of bracket 68 there is tightly secured to shaft 66 a pulley 80 about which is wound a cable 82 which passes through a cut-out portion 84 (FIGURE 3) to a turnbuckle 86 secured to the central lower surface of platform 14 by means of a bracket 88 secured thereto. Since the force of gravity will always tend to urge the platform to its lowermost position against the tension of cable 82, the latter may be used to accurately set and maintain the vertical position of the platform. The elevation of platform 14 is thus regulated by the angular position of adjusting arm 64. Accordingly, to adjust the level of platform 14 handle 72 is pulled away from framework 11, against the tension of spring 78, until pin 74 is withdrawn from the aperture in which it was previously disposed, and is then rotated to the desired position, whereupon it is released and pin 74 is drawn into aperture 75 by the force of spring 78 to maintain that in position. The arrangement of slots insures that the table will remain level at all elevations. As it will become apparent hereinafter, in actual practice the platform should be adjusted to a position wherein the upper surface thereof is disposed below the upper surface of table 10 a distance equal to approximately one-half the thickness of the article to be packaged.

As noted above, the present invention utilizes heated resistance wires to achieve the necessary cutting and/or sealing function, and the present arrangement is such that a plastic film bag may be formed and an article entirely enclosed and sealed therewithin in one operation. The resistance wires are supported by the presser assembly and the necessary circuitry for controlling the power thereto is disposed within housing 18. As can be seen, the primary support element of the presser assembly is a generally U-shaped tubular member including a front cross-bar 90 and rearwardly extending legs 92 and 94, each secured at its free end to housing 18. Disposed about the central portion of cross-bar 42 is a gripable sleeve 96 which may be manually grasped to raise and lower the entire presser assembly about axle 20.

At one side of the presser assembly there is provided a support member 98 secured at its forward end to crossbar 90 by means of a suitable screw or the like 100 and having its rearward end extending through a vertical slot in housing 18, as best seen in FIGURE 3. The rearward lower end of support member 98 is recessed, as at 102, so as to be supported by longitudinally extending axle 20. Thus, support member 98 is securely held in position by the combined action of screw 100, the slot and axle 20. As can best be seen in FIGURES 1 and 2, support member 98 is positioned so that it will overlie the working surface of the table adjacent and parallel to the transversely extending edge 37 of opening 39, and is of a length such that the lower surface thereof extends a distance greater than the length of edge 37 so as to fully traverse the width of the maximum width plastic film which may be used, at least to a point disposed forwardly of edge 38. Along this lower edge of support member 98 there is secured, as by means of a suitable adhesive or the like, a strip of appropriate insulating material 104 having a centrally positioned groove 106 extending the length of the lower surface thereof (FIGURES 4 and 5). Groove 106 is adapted to receive a resistance wire 108, formed by any suitable material which will quickly heat when a voltage is placed across it. The depth of groove 106 is substantially less than the diameter of wire 108 so that a major portion of the wire will project below the lower surface of the strip of insulating material 104.

Adjacent the rearward end of support member 48 there is provided an upwardly extending notch 110 disposed within housing 18. Positioned within notch 110, as by means of screws 112 or the like, is a heat conducting element or jumper 114 and a metallic spring element 116 to the lower end of which is secured resistance wire 108. Spring element 116, best illustrated in simplified FIGURE 11, is provided with a reversely bent lower end portion 118, across the bight of which is provided a slot 120. To secure wire 108 to spring element 116, a small metallic bead 122 is secured to the end of the wire, as by pinching or the like, and then the wire is positioned in slot 120 with the bead disposed within the bight portion of the reversely bent end 118. In FIGURE 11 spring element 116 is also illustrated in phantom lines in a relaxed position, and as can be seen the legs thereof are disposed in an acute angle with respect to each other. When wire 108 is secured to the spring element and tensioned the latter is biased to the position illustrated in FIGURES 3 and 11, wherein it serves to maintain the wire in tension. Heat conducting element or jumper 114 is provided with a reversely bent lower end portion 124 which contacts wire 108 at a point adjacent the end of the groove in the insulating strip, portion 124 being embedded therein. Jumper 114 is provided to prevent overheating of the exposed portion of the wire between the end of the groove and the spring element by short circuiting the exposed portion to the spring element, to minimize the chances of the wire breaking in that portion. Heat conducting element 114 is preferably made of some suitable highly conductive material, such as copper or the like, and it is not necessary that it be resilient, as is the spring element. The tension exerted by spring element 116 when biased into a substantially right angle position, as shown in FIGURE 3, may be regulated or adjusted by notching or grinding away an edge thereof to reduce its resistance to bending. Wire holding slot 120 may, of course, be positioned in any suitable location on end portion 118 of the spring element.

At its opposite end wire 108 is secured by means of a metal bead 126, similar to bead 122, to a conductor plate 128 secured at the forward end of support member 98, as best illustrated in FIGURES 4 through 6. Conductor block 128, which may be of any suitable conducting material, is generally rectangular in shape, having a rearwardly extending slot 130 and a transversely extending slot 132, each of which is provided with a threaded bore 134 adapted to receive a set screw 136. The conductor block is of substantially the same width as support member 98 and is secured to the latter in a recess 138 therein at the forward end thereof by means of a suitable screw 140. Wire 108 extends forwardly along groove 106 in the strip of insulating material 104 and then upwardly through a smoothly contoured notch 142 at the forward end of strip 104. From there the wire extends through slot 130 in conducting block 128 and is provided with bead 126 positioned within bore 134 to maintain it in position in the manner illustrated. Thus, as can be seen, wire 108 is firmly secured at its forward end in a conducting relationship to conductor block 128 and its rearward end in a conducting relationship to spring element 116, the latter being biased to maintain the wire in tension.

Surrounding support member 98 for substantially the full length thereof is a channel-shaped hold-down member 144. As can be seen, the lower edges of hold-down member 144 project below the lower surface of strip 104 and wire 108, so that the latter are to some extent protected. Hold-down member 144 is mounted for vertical movement with respect to support member 98 by means of a pair of vertically projecting screws 146 and 148 secured to the upper surface of support member 98. Between the heads of screws 146 and 148 and the upper surface of hold-down member 144 there are provided a pair of compression springs 150 and 152, respectively, for urging the hold-down member downwardly to the position illustrated in FIGURES 3 and 4. The primary functions of the hold-down member will be discussed in detail hereinafter.

The presser assembly is provided with a second support member 154 disposed at the forward end thereof parallel to front cross-bar 90. Support member 154 is secured at one end to leg 94 by means of a suitable screw 156, and at the opposite end to support member 98, by means of a pair of screws 158 and 160 which pass through the latter. Support member 154 is so positioned that the lower surface thereof will overlie the working surface of the table adjacent and parallel to the longitudinally extending edge 38 of opening 39, and is provided along this surface with a strip of insulating material 162 having a centrally positioned groove 164 extending the length of the lower surface thereof. Positioned within groove 164 is a resistance wire 166 extending at its left end, as seen in FIGURE 4, upwardly along a smoothly contoured notch 168 in insulating strip 104 and then through slot 132 in conducting block 128, where it is permanently held by means of a metallic bead 170 secured in bore 134 by means of set screw 136. Thus, as can be seen, wires 108 and 166 are mounted at their adjacent ends in a conducting relationship with each other. As can be best seen in FIGURE 4, wire 166 extends almost to wire 108 before it passes upwardly through insulating strip 104. This is desirable in order that seals created by the two wires will be substantially joined, but the wires should not touch at their point of proximity along the lower surface of the insulating strip since this would prevent current from flowing through the end of wire 108 which extends forwardly of wire 166. Since both wires should be heated throughout their entire length it is important that they communicate electrically with each other only at their ends.

At the right hand end of support member 154, as best seen in FIGURE 2, there is provided an upwardly extending notch in which are secured a conducting element or jumper 168, similar to jumper 116 and a metallic spring element 170, similar to spring element 114. Wire 166 is secured to spring element 170 by extending through a slot in the latter and being provided with a metallic bead to maintain it in position, in the aforementioned manner. Spring element 170 is biased to the position illustrated in FIGURE 2 when wire 166 is secured thereto so that the latter will be tensioned in the final assembly. As will be appreciated, electrical potential placed across spring elements 116 and 170 will cause a current to flow through the full lengths of both wires 108 and 166 whereby they will be heated. It is important that the wires be maintained in tension by resilient means since when they become heated they expand and become longer, so that if they were secured by rigid means they would then become excessively slack and fall out of the grooves designed to contain them.

Support member 154 is provided with a channel-shaped hold-down member 172, similar to hold-down member 144, mounted for vertical movement upon screws 174 and 176 projecting vertically from the upper surface of the support member and provided with springs 178 and 180, respectively, to bias the hold-down member downwardly.

The resistance wires are so arranged that the seals formed thereby will be positioned adjacent and parallel to the inside and forward edges 37 and 38 of opening 39 in the table. To prevent the heat from the wires from entering the table surface as well as to prevent melted plastic film from sticking thereto, the portions of the table underlying the resistance wires when the presser assembly is lowered are specially constructed. Thus, as best seen in FIGURE 10, the portion of the table underlying wire 166 is provided with a recessed portion 182 in which is rigidly secured an elongated channel-shaped member 184 having inwardly directed narrow flanges 186. Securely held in place within member 184 by flanges 186 is a strip of suitable resilient material 188, such as neoprene foam or the like. Disposed on top of the strip of foam material 188, and also held in place by flanges 186, is a strip of Teflon or silicone rubber impregnated glass fabric 190. It is the purpose of this fabric to prevent sticking of the heated or melted plastic film to the table top when the resistance wires are heated, and the above two materials have been found satisfactory for this purpose, although others certainly may be used. When, after repeated use, fabric 190 begins to break down or otherwise deteriorate, it may be quickly repaired by simply placing a relatively narrow strip of pressure sensitive tape of the same material along the worn out portion thereof, such as indicated in phantom lines at 192.

As can best been seen in FIGURE 1, recessed portion 182 extends along the forward longitudinally extending edge 38 of opening 39 a distance corresponding to the exposed length of resistance wire 166, which should be as great as the longest longitudinal dimension to be encountered in any article to be packaged. The inside transverse edge 37 is also provided with a specially constructed heat resistant portion 194 which is identical in all respects to the construction illustrated in FIGURE 10, extending forwardly and rearwardly of edge 38 a sufficient distance to traverse the width of the largest width plastic film which may be handled by the apparatus from the rearward folded edge thereof to a point in front of recessed portion 182. Portion 194, of course, underlies resistance wire 108, which must be arranged to cut and/or seal a capacity sized piece of film from the rearward folded edge thereof to a point forwardly of the seal therein formed by wire 166.

As noted above, presser assembly 16 is pivotally mounted with respect to table 10 so that it may be removed to and from a position wherein the two resistance wires contact, throughout their lengths, portions 190 and 194. As best seen in FIGURE 8, wherein the bottom of housing 18 is shown with bottom cover 23 removed, a pair of torsion springs 196 and 198 are provided to counterbalance the overhanging weight of the presser assembly about shaft 20, so that a minimum amount of force need be exerted to raise and lower the presser assembly. Torsion spring 196 is secured at one end to a collar 200 rigidly secured to fixed shaft 20, and is provided at the other end with a projecting portion 202 adapted to engage the side wall of housing 18 to urge the housing in a clockwise direction, as seen in FIGURE 3. Similarly, torsion spring 198 is secured at one end to a collar 204 rigidly secured to fixed shaft 20, and at the other end thereof is provided with a projecting portion 206 adapted to engage the opposite side wall of housing 18 in the same manner as extension 202, and for the same purpose. To prevent wearing of shaft 20 by the relative movement of springs 196 and 198, there are provided a pair of hardened metal sleeves 208 and 210, respectively, therebetween. The raised position of the presser assembly is limited by a resilient stop 207 of rubber or the like on the rear surface of table 10.

In FIGURE 13 there is schematically illustrated an electrical circuit which may be used in conjunction with the present invention. As will be observed, spring elements 116 and 170, resistance wires 108 and 166, and conductor block 128, all of which have been previously described, form a part of the present circuit. The other elements thereof are disposed within housing 18, as best seen in FIGURES 3 and 8. They include a pair of normally open micro-switches 212 and 214 rigidly secured to one end of housing 18 in any suitable manner flush with the bottom edge thereof so that they may be activated when presser assembly 16 is moved to its lowered position, such as shown in FIGURE 3 but with the resistance wires in contact with layers of plastic film on the top of table 10. This may be achieved by providing bottom cover 23 with a pair of suitably located apertures through which the plungers of the two micro-switches may project. Mounted upon support member 98 within housing 18 is a third micro-switch 216, the plunger 218 of which is activated directly by the end of spring element 116. Thus, as can be seen in FIGURE 3, micro-switch 216 will be responsive to the expansion of wire 106, and hence to the temperature thereof, which is directly proportional to expansion. The degree to which it is responsive will of course depend on its relative position with respect to the end of spring element 116, and this may be adjusted by pivotally securing micro-switch 216 to supporting member 98 by means of a T-shaped bracket 220 provided with an upwardly extending tongue portion 222 which is pivotally secured to support member 98 by means of a shouldered machine screw 224, as best seen in FIGURES 3 and 7 and 8. Secured to or forming a part of bracket 220 is a forwardly and downwardly extending arm 226, to the outer end of which is connected a coiled spring 228 having its opposite end secured to the bottom forward edge of housing 18. The resulting biasing of micro-switch 216 toward the forward face of housing 18 is opposed by means of an adjusting screw 230 passing through a threaded aperture in the front face of housing 18 and engaging arm 226. The outwardly projecting end of adjusting screw 230 is provided with a locking nut 232 and a manually operable knob 234. As will be appreciated, adjusting screw 230 may be turned to adjust the position of micro-switch 216 with respect to spring element 116 so that any predetermined amount of expansion of resistance wire 108 may be utilized to trip micro-switch 216. Thus, in effect, means are provided for adjusting the maximum temperature of the resistance wires. Lock nut 232 may be positioned on adjusting screw 230 so as to prevent adjustment of micro-switch 216 to a point beyond the maximum possible extension of the wire before the breaking point.

In order to signal the operator when the power to the apparatus is on and when the resistance wires are energized, respectively, there are provided in the forward inclined wall of housing 18 a white indicator light assembly 236 and a red indicator light assembly 238. Between them there is positioned a main power switch 240. For purposes of clarity, the necessary wiring is not shown in FIGURE 8, but only the main electrical components of the circuit. If desired, the wire to spring element 170 may pass through tubular leg 94 of the presser assembly.

The wiring for the circuit is clearly illustrated in FIGURE 13 wherein terminals A and B indicate the input source of A.C. power. To energize the entire apparatus, the operator manually closes main power switch 240 which will energize the white indicator light to appraise the operator of the fact that the power is now on. Since the presser assembly will be in the raised position prior to actual use, micro-switches 212 and 214 will remain in their normally open positions. The use of double switches to break both sides of the power circuit is a safety feature by which both of the resistance wires are completely isolated from the source of power, to eliminate the chance of the operator getting any kind of shock from them or of them becoming energized prematurely.

When the plastic film and article to be packaged are properly positioned on the table, as will be more fully described hereinafter, the presser assembly is lowered against the torsional balancing force of springs 196 and 198, and then pressed down against the resisting force of compression springs 146, 148, 174 and 176 to close micro-switches 212 and 214 and put the resistance wires in contact with the film. The closing of these micro-switches causes full power to be applied across series connected resistance wires 108 and 166, whereupon they will become heated. As the temperature increases, they of course expand until spring element 116 moves a sufficient distance to trip micro-switch 216 from the position shown in FIGURE 3, wherein the normally closed contact is closed, to a position wherein the normally closed contact is opened and the normally opened contact is closed. This will cause the source of power to be removed from the resistance wires, whereupon they will cool and contract, and in addition cause red light 238 to be energized. As the resistance wires cool and contract, however, micro-switch 216 will move to its normally closed position to again heat the resistance wires. As will be appreciated, this cycle will repeat until the presser assembly is raised to open micro-switches 212 and 214. As is apparent, the maximum temperature attained by the wires will be determined by the position of microswitch 216 with respect to spring element 116. Thus, excessive heating of the resistance wires, such as would cause them to break, may be prevented by adjusting locknut 232 on adjusting screw 230 so that when the latter is turned up tight against the front face of housing 18, i.e. the maximum temperature setting, the micro-switch will be positioned just within the maximum safe range of expansion and hence temperature of resistance wire 108. Since in any given unit the two resistance wires will be of the same material, the sensing of the expansion of only one of them will serve to protect both of them from overheating.

Thus, by virtue of this safety feature practically instantaneous heating is achieved by applying maximum power to the resistance wires initially to quickly bring them to full operating temperature. Referring to FIGURE 13, it will be noted that the red indicator light will flash every time micro-switch 216 opens in response to the expansion of the resistance wires, so long as the presser assembly is in the operating position with micro-switches 212 and 214 closed. Accordingly, the operator may be instructed to hold the presser assembly down for a predetermined number of flashes of the red light in order to be assured that complete cutting and sealing or just sealing have taken place. The number of flashes specified would, of course, depend upon the thickness of film to be sealed, whether or not it is to be cut as well as sealed, the type of resistance wires used, the size of the packaging apparatus and the article to be packaged, and so on.

Because of the provision of adjusting screw 230, a number of possible modes of operation are possible. For example, when it is desired to both seal and cut relatively thick plastic film the adjusting screw may be turned all the way in to the maximum temperature position, lower temperature settings being used for thinner film. On the other hand, if it is desired simply to seal several layers of plastic film without severing them, the adjusting screw may be unscrewed to thereby lower the maximum temperature which will be attained by the resistance wires. In actual practice, the correct operating temperature is easily determined for a given job by simply unscrewing adjusting screw 230 to the point where micro-switch 216 opens the normally closed contact in the absence of power to the wires. The correct setting may then be determined by trial and error, turning the adjusting screw inwardly a small amount each trial to gradually increase the maximum temperature of the wires until the desired results are obtained. The adjusting screws may then be left in this setting until another application arises.

As best seen in FIGURES 1, 9 and 12, adjustable stop means are provided for quickly, accurately and conveniently locating articles in the proper position upon platform 14, namely in the corner thereof defined by edges 37 and 38 of opening 39. The stop means comprises a pair of parallel elongated slots 244 and 246 extending through platform 14 adjacent the forward and rearward edges thereof. Extending transversely across platform 14 is a U-shaped rod member 248 having threaded legs 250 and 252 extending downwardly through slots 244 and 246 respectively. Slidably disposed on the horizontal portion of rod 248 are two relatively short stops 254 and 256 and a relatively long stop 258. Stops 254 and 256 may thus be arranged to limit movement of an article on platform 14 in the longitudinal direction, and stop 258 may be positioned to limit the rearward transverse movement of an article. The entire stop assembly may be moved longitudinally on the platform by sliding U-shape member 248 longitudinally in slots 244 and 246, wing nuts 260 and 262 being provided on the threaded ends of legs 250 and 252, respectively, to tightly secure the stop means in place.

One manner in which the packaging apparatus of the present invention is operated is illustrated in FIGURES 14 through 18. The operation will be described in conjunction with the individual packaging of a generally rectangular shaped package 242, having a length, depth and thickness substantially as shown. To ready the apparatus for operation platform 14 is lowered and set a distance below the top of table 10 a distance equal to one-half the thickness of article 242. Stops 254, 256 and 258 and rod 248 are then positioned so that when an article 242 is slid to the right onto platform 14 it will be stopped in a position thereon in the corner defined by edges 37 and 38 of opening 39. A roll of center-fold plastic film material 28, such as polyethylene or other thermoplastic film, having a width slightly greater than the depth of article 242 is rotatably supported upon rollers 24, and collars 30 are adjusted to properly guide the roll of film material. The fold in the film material will be on the inside edge, indicated at 264. The main power switch may then be turned on, the presser assembly being in the raised position, and the film material pulled from the roll across the table with one layer below loading tray 32 and the other layer above it until the end of the material extends to the edge 37 of opening 39. Since a new roll of material is being used, it is necessary to seal the end thereof, and this is achieved by lowering the presser assembly and pushing it down against the table until the red light flashes at least once, at which time a seal 266 will be effected at the end of the material and the presser assembly may be raised. This operation is only necessary at the beginning of a roll, as it will be more apparent hereinafter. Article 242 is then placed on the loading tray and slid beneath the upper layer of the plastic film into the corner therein defined by folded edge 264 and seal 266, as shown in FIGURES 14 and 17.

To package the article, the operator then simply grasps it between the layers of film and pushes it to the right until the right hand edge thereof abuts the stops, as shown in FIGURE 15. This movement will pull the plastic film from the roll and when the article reaches the stops it will drop downwardly onto platform 14. With the article thus positioned the presser assembly is lowered and pushed down against the table. Since resistance wires 108 and 166 will be heated when the presser assembly is lowered, wire 108 will cut and seal the two layers of film along a line 268 and wire 166 will cut and seal the two layers along a line 270, as shown in FIGURES 16 and 18. Each of the heated wires serves to fuse the two layers of film together along the line where the wires press the layers against the table, and the downward force of each wire actually cuts through the layers along the center of the seal formed thereby. The result is two separate double layer sections each having the newly cut edges thereof sealed together, this general principle being well known in the art. Since a spring biased hold-down member urges the layers together on each side of each resistance wire a good seal will be obtained, even though one or more of the layers is wrinkled to the extent tha good contact would not otherwise exist between them. The hold-down member also prevents the wrinkled edges from springing apeart after they have been cut and before the seal has set. Article 242 will then be fully packaged between the layers of plastic film by folded edge 264 thereof and seams 266, 268 and 270, at which time it may be removed from the apparatus ready for shipping, or the like. The remaining extra section of film material, indicated at 272, may be discarded as scrap. Because of the present arrangement the new free end of the film from the roll will be provided with a transverse seam 268, and thus will be ready for the packaging of another article, the first step necessary when a new roll is used now being eliminated. From the above description it should be noted that the operation of an apparatus according to the present invention includes the performance of a novel sequence of steps to form a plastic film bag and enclose an article therein.

As will be readily apparent, any size article may be easily packaged using the present apparatus, simply by adjusting the stops, using a different size roll of film material, providing a different length loading tray 32 or adjusting its position, and adjusting the level of platform 14, so long as the article will fit within the confines of opening 39. For extra large articles a larger apparatus may be used. It has been found that a larger number of articles may be packaged by a single unskilled operator in a relatively short time using the present apparatus. A very neat package with the seal disposed in a single plane about the periphery thereof is achieved by lowering the article a distance equal to one-half its thickness when the layers are sealed together.

Since the maximum temperature of the resistance wires may be easily preset by means of adjusting screw 230, the present apparatus is very flexible in application. For example, the apparatus may be used to seal a plurality of articles in pockets in a strip of a plastic film using a technique similar to the aforementioned one but with the maximum temperature reduced so that the plastic layers are only heat sealed together and not cut.. Since the hold down member engages the film layers on both sides of each resistance wire they are firmly pressed together so that a continuous seal will result without separation prior to fusion.

In applications where it is desired to maintain a plurality of rolls of plastic film on the apparatus for convenience, such as when a plurality of colors, sizes, thicknesses, etc. are required, a modified roll carrying construction such as illustrated in FIGURE 19 may be provided. Here, instead of two rollers, there are provided a pair of opposed mounting members 270, only one of which is shown, between which are rotatively supported four pairs of plastic film roll supporting rollers 272, 274, 276 and 278, each provided with suitable sliding collars 30 for supporting a roll 28 in the manner illustrated. Between the lower two pairs of rollers 276 and 278 there is provided an extra roller 280 about which may be trained film from the upper two rolls 28 in such a way that there will be no interference between the film therefrom and the lower two rolls of film. Roller 280 is also provided with suitablle collars 30 and is constructed identical to the other rollers. In use, film may then be selectively drawn from any one of the four rollers in the above manner.

As a practical matter, it has been found that in replacing presser assemblies for the present apparatus it is extremely desirable that it be adapted to be shipped as a separate unit, including axle 20 and bracket 22, with torsion springs 196 and 198 pretensioned so that it may be put into use by simply bolting the brackets 22 to a table with the assembly already fully counterbalanced. To effect this, axle 20 is threadedly engaged within right hand bracket 22 and provided with a lock nut 282. In addition, aligned apertures are provided in the right hand end of housing 18 and through brackets 22, at 284 and 286 respectively (FIGURE 1), these aligned apertures being adapted to receive a removable cotter pin or the like. To pretension the presser assembly unit independent of table 10, all the parts are assembled in the manner illustrated in FIGURE 8 with the locknut tightly locked, whereupon the right hand bracket 22 is turned, along with axle 20 and collar 204, until the proper amount of torsion is exerted by springs 196 and 198. Apertures 284 and 286 are then brought into alignment and a cotter pin or the like inserted therethrough to lock the assembly in a pretensioned condition. The assembly may then be mounted by bolting brackets 22 to a table, at which time the cotter pin may be removed and the assembly will be fully counterbalanced.

Thus, there are disclosed in the above description and in the drawings several exemplary embodiments of the present invention which fully and effectively accomplish the objects thereof. However, it will be apparent that variations in the details of the construction may be indulged in without departing from the sphere of the invention as herein described or the scope of the appended claims.

What is claimed is:

1. Apparatus for forming plastic bags, comprising: support means for supporting a plurality of layers of plastic film; arm means movable relative to said support means to and from a poistion wherein the lower surface of said arm means engages film disposed on said support means; a resistance wire disposed along the lower surface of said arm means; spring means for tensioning said resistance wire; electrical power means for heating said wire when said arm means is moved to said position, whereby layers of plastic film on said supporting means may be cut and sealed together along the cut edges thereof by said heated wire; and electrical switch means responsive to movement of said spring means for disconnecting said electrical power means from said resistance wire when the thermal expansion thereof reaches a predetermined amount and causes said spring means to trip said switch means, whereby overexpansion and breakage of said resistance wire may be prevented.

2. Apparatus for forming plastic bags, comprising: support means for supporting a plurality of layers of plastic film; arm means movable relative to said support means to and from a position wherein the lower surface of said arm means engages film disposed on said support means; a resistance wire disposed along the lower surface of said arm means; spring means for tensioning said resistance wire; electrical power means for heating said wire when said arm means is moved to said position, whereby layers of plastic film on said supporting means may be cut and sealed together along the cut edges thereof by said heated wire; electrical switch means responsive to movement of said spring means for disconnecting said electrical power means from said resistance wire when the thermal expansion thereof reaches a predetermined amount and causes said spring means to trip said switch means, whereby overexpansion and breakage of said resistance wire may be prevented; and means for adjusting the position of said switch means with respect to said spring means whereby the temperature attained by said resistance wire may be adjustably pre-set.

3. Apparatus for forming plastic bags, comprising: support means for supporting a plurality of layers of plastic film; arm means movable relative to said support means to and from a position wherein the lowe rsurface of said one arm means engages film disposed on said support means; a resistance wire disposed along the lower surface of said arm means; spring means for tensioning said resistance wire; spring biased hold-down means mounted on said arm means and projecting below the lower edge thereof adjacent said resistance wire, said hold-down means being adapted to urge layers of film on said support means against the latter when said arm means is moved to said position, whereby layers of plastic film on said supporting means may be cut and sealed together along the cut edges thereof by said heated wire; and electrical switch means responsive to movement of said spring means for disconnecting said electrical power means from said resistance wire when the thermal expansion thereof reaches a predetermined amount and causes said spring means to trip said switch means, said switch means serving to prevent the overheating and breakage of said resistance wire.

4. Apparatus for forming plastic bags, comprising: support means for supporting a plurality of layers of plastic film; arm means movable relative to said support means to and from a position wherein the lower surface of said arm means engages film disposed on said support means; a resistance wire disposed along the lower surface of said arm means; spring means for tensioning said resistance wire; spring biased hold-down means mounted on said arm means and projecting below the lower edge thereof adjacent said resistance wire, said hold-down means being adapted to urge layers of film on said support means against the latter when said arm means is moved to said position, whereby layers of plastic film on said supporting means may be cut and sealed together along the cut edges thereof by said heated wire; electrical switch means responsive to movemen of said spring means for disconnecting said electrical power means from said resistance wire when the thermal expansion thereof reaches a predetermined amount and causes said spring means to trip said switch means, said switch means serving to prevent the overheating and breakage of said resistance wire; and means for adjusting the position of said switch means with respect to said spring means whereby the temperature attained by said resistance wire may be adjustably pre-set.

5. Apparatus for forming plastic bags, comprising: support means for supporting a plurality of layers of plastic film; arm means movable relative to said support means to and from a position wherein the lower surface of said arm means engages film disposed on said support means, said arm means including a first arm and a second arm, said second arm disposed perpendicular to and joining said first arm intermediate the ends thereof; a resistance wire disposed along the lower surface of each of said arms; spring means for tensioning each of said resistance wires; electrical power means for heating said wires when said arm means is moved to said position, whereby layers of plastic film on said supporting means may be cut and sealed together along the cut edges thereof by said heated wires; and electrical switch means responsive to movement of one of said spring means for disconnecting said electrical power means from said resistance wires when the thermal expansion of the wire associated with said one of said spring means reaches a predetermined amount and causes said spring means to trip said switch means, whereby overexpansion and breakage of said resistance wires may be prevented.

6. Apparauts for forming plastic bags, comprising: support means for supporting a plurality of layers of plastic film; arm means movable relative to said support means to and from a position wherein the lower surface of said arm means engages film disposed on said support means, said arm means including a first arm and a second arm, said second arm disposed perpendicular to and joining said first arm intermediate the ends thereof; a resistance wire disposed along the lower surface of each of said arms; spring means for tensioning each of said resistance wires; electrical power means for heating said wires when said arm means is moved to said position, whereby layers of plastic film on said supporting means may be cut and sealed together along the cut edges thereof by said heated wires; electrical switch means responsive to movement of one of said spring means for disconnecting said electrical power means from said resistance wires when the thermal expansion of the wire associated with said one of said spring means reaches a predetermined amount and causes said spring means to trip said switch means, whereby overexpansion and breakage of said resistance wires may be prevented; and means for adjusting the position of said switch means with respect to said spring means whereby the temperature attained by said resistance wire may be adjustably preset.

7. Apparatus for forming plastic bags from a continuous length of center-fold plastic film having the free end theerof sealed closed and for sealing articles therein, comprising: support means having a longitudinally extending working surface thereon; means at one end of said surface for rotatably supporting a roll of center-fold plastic film so that the free end of said film may be manually drawn in a longitudinal path across said surface; means defining an opening in said support means at the other end of said surface, said opening having a first edge extending transversely of said surface and a second edge perpendicular to said first edge, the corner of said opening defined by said two edges lying within the path of said plastic film; a vertically movable platform disposed in said opening; arm means movable relative to said support means to and from a position wherein the lower surfaces thereof engage film disposed on said surface, said arm means including a first arm adapted to overlie said surface adjacent and parallel to said first edge and a second arm adapted to overlie said surface adjacent and parallel to said second edge, said first arm being longer than said first edge and extending forwardly of said second arm; resistance wires disposed along the lower surfaces of said arms; and means for heating said wire when said arm means is moved to said position, whereby when an article is positioned between the layers of said film at the free closed end thereof, and the article and film are then moved onto said platform in said corner thereof, said arm means may be moved to said position to cause the layers of plastic film enclosing the article to be cut and sealed together along the cut edges thereof by said heated wire to fully enclosed said article.

8. Apparatus as claimed in claim 7, wherein means are provided for conveniently adjusting said movable platform vertically including a pair of partitions on opposite sides of said platform, means defining a first pair of parallel elongated inclined slots in one of said partitions, means defining a second pair of elongated parallel inclined slots, said second pair of slots being identical to and in horizontal alignment with said first pair of slots, a plurality of rollers mounted on said platform, each of said rollers being positioned in a single one of said elongated slots, and means for moving said platform longitudinally whereby the inclination of said slots will cause said platform to raise and lower.

9. Apparatus as claimed in claim 7, wherein said movable platform is provided with stop means for limiting the longitudinal and transverse movement of an article positioned thereon, said stop means comprising means defining a pair of elongated parallel slots in said platform, a U-shaped support rod extending between said slots with the legs thereof extending downwardly through said slots, a first stop movably mounted on said rod for limiting movement of an article in a longitudinal direction, a second stop movably mounted on said rod for limiting movement of an article in a transverse direction, and means for tightly securing said rod to said platform in any one of a plurality of positions along the length of said slots.

10. Apparatus as claimed in claim 7, wherein said means for rotatably supporting a roll of center-fold plastic film comprises a pair of spaced supporting members, a plurality of pairs of supporting rollers rotatably supported by and extending between said support members adjacent the lower edges thereof, a plurality of pairs of supporting rollers rotatably supported by and extending between said support members adjacent the upper edges thereof, each of said pairs of rollers being adapted to rotatably support a single roll of plastic film, and a further single roller rotatably supported by and extending between said support members adjacent the lower edges thereof and intermediate adjacent lower pairs of rollers, said single roller being adapted to guide film from rolls supported by said upper pairs of rollers beneath the rolls of film supported by said lower pairs of rollers.

11. Apparatus for forming plastic bags from a continuous length of center-fold plastic film having the free end thereof sealed closed and for sealing articles therein, comprising: support means having a longitudinally extending working surface thereon; means at one end of said surface for rotatably supporting a roll of center-fold plastic film so that the free end of said film may be manually drawn in a longitudinal path across said surface; a loading tray secured to said support means and extending substantially parallel to and spaced from said working surface, a portion of said tray being disposed in the path of said plastic film and adapted to extend between the layers thereof; means defining an opening in said support means at the other end of said surface, said opening having a first edge extending transversely of said surface and a second edge perpendicular to said first edge, the corner of said opening defined by said two edges lying within the path of said plastic film; a vertically movable platform disposed in said opening; arm means movable relative to said support means to and from a position wherein the lower surfaces thereof engage film disposed on said surface, said arm means including a first arm adapted to overlie said surface adjacent and parallel to said first edge and a second arm adapted to overlie said surface adjacent and parallel to said second edge, said first arm being longer than said first edge and extending forwardly of said second arm; resistance wires disposed along the lower surfaces of said arms; and means for heating said wires when said arm means is moved to said position, whereby when an article is positioned between the layers of said film at the free closed end thereof using said loading tray, and the article and film are then moved onto said platform in said corner thereof, said arm means may be moved to said position to cause the layers of plastic film enclosing the article to be cut and sealed together along the cut edges thereof by said heated wire to fully enclose said article.

References Cited by the Examiner

UNITED STATES PATENTS

| | | | |
|---|---|---|---|
| 355,611 | 1/1887 | Howson | 339—275 |
| 2,146,308 | 2/1939 | Maxfield | 53—28 |
| 2,272,530 | 2/1942 | Patterson | 53—28 |
| 2,692,328 | 10/1954 | Jaye | 83—170 |
| 2,961,031 | 11/1960 | Fener | 156—380 |
| 3,004,129 | 10/1961 | Koci | 200—137 |
| 3,006,122 | 10/1961 | Weishaus | 53—182 |
| 3,035,381 | 5/1962 | Hosso | 53—182 |
| 3,047,991 | 8/1962 | Siegel | 53—182 |

TRAVIS S. McGEHEE, *Primary Examiner.*

ROBERT A. LEIGHEY, FRANK E. BAILEY,
*Examiners.*